United States Patent [19]

Larue et al.

[11] Patent Number: 4,611,109

[45] Date of Patent: Sep. 9, 1986

[54] GAS AND PROCESS FOR PLASMA ARC CUTTING

[75] Inventors: Jean-Pierre Larue, Osny; Georges Duboz, Paris; Claude Carsac, Saint-Leu-La-Foret; Gérard Marhic, Cergy, all of France

[73] Assignee: L'Air Liquide, Societe Anonyme pour l'Etude et l'Exploitation des Procedes Georges Claude, Paris, France

[21] Appl. No.: 708,516

[22] Filed: Mar. 5, 1985

[30] Foreign Application Priority Data

Mar. 16, 1984 [FR] France ............................ 84 04046

[51] Int. Cl.$^4$ .............................................. B23K 15/00
[52] U.S. Cl. ........................ 219/121 PY; 219/121 PH; 219/121 PU; 204/179; 423/405
[58] Field of Search ................ 219/121 PQ, 121 PM, 219/121 PD, 121 PY, 121 PP, 74, 75, 76.16; 204/192 E, 164, 165, 177–179; 156/643, 646; 427/34; 423/400, 405

[56] References Cited

U.S. PATENT DOCUMENTS

| 3,534,388 | 10/1970 | Ito et al. | 219/121 PH |
| 3,575,568 | 4/1971 | Tateno | 219/121 PH |
| 4,431,477 | 2/1984 | Zajac | 204/192 E |
| 4,445,991 | 5/1984 | Arbit | 204/165 |

Primary Examiner—M. H. Paschall
Attorney, Agent, or Firm—Browdy and Neimark

[57] ABSTRACT

There is proposed as a plasma-producing gas, a gas containing the elements nitrogen and oxygen chemically combined in a nitrogen oxide and in particular nitrous oxide. These plasma-producing gases or mixture of gases stored in a bottle, a frame, a container, a tank, in the gaseous or liquid form at ambient or cryogenic temperature, are applicable to the plasma arc cutting of electrically conductive materials.

10 Claims, 1 Drawing Figure

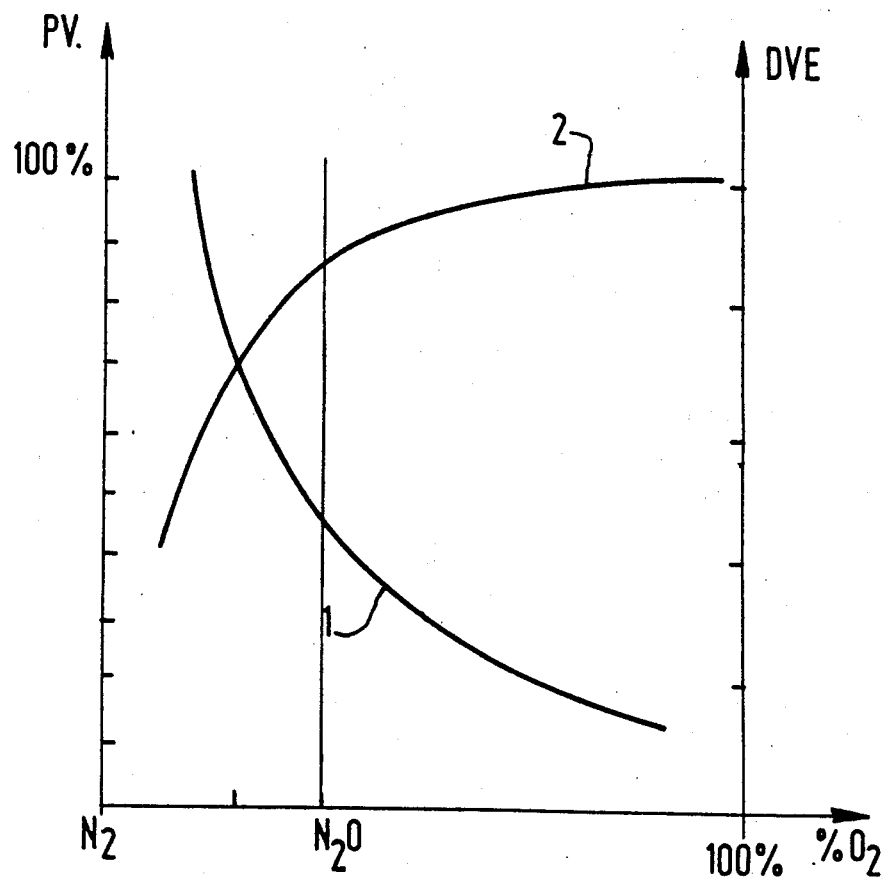

GAS AND PROCESS FOR PLASMA ARC CUTTING

FIELD OF INVENTION

The present invention relates to plasma-producing gases or mixtures in the field of plasma arc cutting.

BACKGROUND

The plasma-producing gases or mixtures of gases formed by argon-hydrogen or nitrogen, and possibly by the three constituents, have been known practically from the origin of the process of plasma arc cutting.

Since 1962, pure oxygen and compressed air have been proposed for the market in North America as plasma-producing gases in plasma cutting torches. However, for technical reasons such as insufficient knowledge of the process, of the equipment and of the behaviour of the electrodes, and for commercial reasons, the use of these plasma-producing gases which were more particularly recommended for mild steel have not had the expected immediate development.

The first publication relating to plasma cutting experiments carried out in the laboratory with nitrogen-oxygen mixtures in variable proportions different from air is due to the works of O'Brien described during the annual meeting of the American Welding Society, Detroit (Mich.) May 4 to 8, 1964. The author showed the advantages of an enrichment with oxygen by providing several curves of speed relative to the thickness to be cut and to the intensity of the arc. He also gave information relating to the reduction in the life of the electrodes when this percentage is increased. In this study, the author concluded that the nitrogen-oxygen mixture 80/20%, i.e. compressed air, is the best compromise.

Later, around 1970, the researchers of the Institut Von Ardenne, and then many other technicians constructed equipment employing either compressed air or pure oxygen to the exclusion of any other mixture.

It is well known that the life of electrodes used in compressed air plasma cutting, though short, nonetheless remains longer than that of the nozzles which are much more subjected to of the erosion of the arc, to the striking of the arc, to metal projections which can obstruct the nozzle, and even to handling incidents such as contact of the nozzle to the metal being cut. Experience in the art shows that users who must replace the worn nozzle also change the electrode for precautionary reasons so as to resume the work with a new electrode-nozzle "pair" and vice versa.

For example, with compressed air, or a 20/21% mixture of nitrogen and oxygen corresponding to the best proposed compromise, the life of the nozzle is approximately one half of the life of the electrode.

SUMMARY

A plasma-producing gas has been sought which has substantial advantages over the use of compressed air, in particular regarding performances such as cutting speed, cutting quality, operational facility, safety of operation and also safety as concerns supplies.

There is proposed as a plasma-producing gas in plasma arc cutting, a gas containing the elements nitrogen and oxygen which are chemically combined in a nitrogen oxide form and in particular in nitrous oxide $N_2O$.

Other nitrogen oxides might also be used.

BRIEF DESCRIPTION OF DRAWING

The sole FIGURE is a graph plotting wear resistance and cutting speed.

DETAILED DESCRIPTION

Under well-determined test conditions there is shown in the diagram of the accompanying drawing, the curve 1 of the wear of the electrodes with nitrous oxide as the plasma-producing gas. Compressed air and the nitrous oxide were plotted as abscissae and the life of the electrodes DVE was indicated in hours as ordinates. This life is measured on an automatic cutting bench with an automatic water-cooled torch. The wear of the electrodes is ascertained by measuring the depth of the crater formed at the zirconium insert by the successive erosions of the cathode spot during the different strikings of the arc and cutting times; the electrode is considered to be worn when this crater has a depth of 2 mm. The results of these experiments showed that, when nitrous oxide is used as a plasma-producing gas in a plasma arc cutting process carried out on metals, in the present state of the art, the life of the electrode is very distinctly increased.

Under these conditions, considering the curve of the cutting speed given on the curve 2 of the diagram of the accompanying drawing, the compressed air and the nitrous oxide were plotted as abscissae and the speed performance PV were plotted as ordinates. As concerns the performance criterion, it relates to the cutting speed on ordinary steel in respect of good quality cutting aspects. The curve is plotted as a percentage of the maximum speed measured with pure oxygen.

The gases of the invention, in the thermal cutting of all electrically conductive materials, for example metals, in particular steels and especially carbon steels, present advantages related to their use over the use of compressed air.

Among the advantages of nitrous oxide as concerns performances, there may be mentioned an increase in the cutting speed of 15 to 35% with respect to air.

Moreover, a distinct improvement has been found in the cutting quality, the cut being more white and more brilliant and having scories which are less adherent with nitrous oxide.

Further, a greater ease of operation was found for the cutting of thicknesses at the limit of the possibilities of the equipment: for identical thickness and speeds, the intensity of the arc is weaker.

As concerns safety of operation, the purity of the gas avoids risks of poor operation and even destruction of the torch related to the use of impure gases due to the presence of dusts, traces of oil and water . . . of which the gases proposed by the invention are devoid.

The use of the mentioned plasma-producing gas in plasma cutting has no limitation which would be related to the manner in which it is stored, such as in a bottle, frame, tank vessel, container in the gaseous or liquid form, at ambient or cryogenic temperature.

The storage of nitrous oxide in the liquid form at ambient temperature imparts considerable autonomy and considerable mobility to the equipment. This gas should find important applications in manual cutting.

What is claimed is:

1. In a method of plasma arc cutting of an electrically conductive material using a plasma-producing gas, the improvement wherein said plasma-producing gas comprises a compound of the elements nitrogen and oxygen in an amount sufficient to reduce electrode destruction.

2. A method according to claim 1, wherein said compound of the elements nitrogen and oxygen is nitrous oxide.

3. A method according to claim 2, wherein said electrically conductive material is a metal.

4. A method according to claim 2, wherein said electrically conductive material is ordinary steel.

5. A method according to claim 1, wherein said plasma-producing gas consists essentially of nitrous oxide.

6. A method according to claim 1, wherein said plasma-producing gas is nitrous oxide.

7. A method according to claim 5, wherein said electrically conductive material is metal.

8. A method according to claim 6, wherein said electrically conductive material is metal.

9. A method according to claim 5, wherein said electrically conductive material is ordinary steel.

10. A method according to claim 6, wherein said electrically conductive material is ordinary steel.

* * * * *